United States Patent [19]

Garrison et al.

[11] 4,083,518
[45] Apr. 11, 1978

[54] MAST TORQUE METERING SYSTEM

[75] Inventors: James R. Garrison, Arlington; Robert W. Metzger, Hurst; Herman H. Waldrup, Arlington, all of Tex.

[73] Assignee: Textron, Inc., Providence, R.I.

[21] Appl. No.: 581,825

[22] Filed: May 29, 1975

[51] Int. Cl.² .......................................... B64C 27/00
[52] U.S. Cl. ............................ 244/17.11; 73/136 A; 416/38; 416/61
[58] Field of Search ............... 244/17.11, 17.13, 17.27, 244/17.19, 17.21; 416/61, 38, 43, 31; 73/136 A

[56] References Cited

U.S. PATENT DOCUMENTS

| | | | |
|---|---|---|---|
| 2,397,935 | 4/1946 | Gardiner et al. | 73/136 A |
| 2,699,833 | 1/1955 | Jensen | 244/17.21 |
| 3,174,551 | 3/1965 | McCarthy | 416/38 |
| 3,538,762 | 11/1970 | Parkinson et al. | 73/136 A |
| 3,625,055 | 12/1971 | Lafourcade | 73/136 A |
| 3,672,213 | 6/1972 | Watson | 73/136 |

FOREIGN PATENT DOCUMENTS

| | | | |
|---|---|---|---|
| 578,219 | 6/1959 | Canada | 73/136 A |
| 617,064 | 2/1949 | United Kingdom | 73/136 A |

Primary Examiner—Galen L. Barefoot
Attorney, Agent, or Firm—Richards, Harris & Medlock

[57] ABSTRACT

In a helicopter, torque display for a main rotor mast is mounted and connected to be driven from a power source at its base and connected to a main rotor at its tip. A reference member secured inside the main mast at the tip thereof depends freely and extends coaxially the length of the mast to a point adjacent the base thereof. A separate index is carried by the reference member adjacent to the base and by the main rotor mast adjacent to its base. A pick-off senses rotational movement of one index relative to the other and provides for actuation of a torque indicator for the pilot of the helicopter.

2 Claims, 5 Drawing Figures

MAST TORQUE METERING SYSTEM

This invention relates to the generation and display of information for a pilot in his control of the application of power to a rotor of a helicopter.

The invention is particularly useful and adaptable to helicopters having one rotor. Helicopters are provided with engine systems which are generally characterized as flat rated. One or more engines drive a main rotor and a tail rotor through a transmission system. The transmission system normally is made to accommodate torque supplied the main rotor at a total rating generally substantially less than the rated engine output. Through the transmission, the power delivered from the engines is applied to the main rotor and to a tail rotor under separate controls in order to establish or maintain a desired attitude or condition of the aircraft during flight.

Heretofore in such systems, the torque delivered by the engine system has been sensed at the engine output shaft, i.e., ahead of the input to the transmission. The torque delivered by the engines and thus sensed is then displayed on a pilot control panel with a limit level for normal operations being indicated on the display system. That is, a red line placed on a meter face designates the maximum power that can be safely transmitted through the power train leading from the engine. Thus a meter conventionally is energized by a signal which represents the actual power being delivered to the transmission at any given time. The pilot then can operate the power system such that he never exceeds the capability of the power train connecting the engine to the main rotor and tail rotor.

The power delivered by the engine system is then divided between main rotor and tail rotor under the control of the pilot inputs.

In certain flight conditions, much more power is demanded by the tail rotor than in other flight conditions. At hover, it has been found that the gearing system in the power train utilizes about 5% of the total power delivered from the engine. At hover, about 10% of the power delivered is utilized by the tail rotor. This leaves 85% of the power for utilization in the main rotor system.

In contrast, at some level flight conditions, while the same 5% of the power is utilized by the gear train, no power is required by the tail rotor. This leaves 95% of the power available to be utilized by the main rotor without exceeding the limits of the transmission system.

The present invention is directed to a pilot information system wherein a torque measurement is provided, the torque being measured at the output of the transmission system to the main mast. Actual power being delivered to the main rotor is displayed. Thus, when the aircraft is in hover and requires power to be delivered to the tail rotor, the pilot can operate the engines at a level such that the maximum power capable of being utilized through the transmission system can be applied directly to the main rotors, greatly increasing payload that can be carried by a given aircraft for a given hover ceiling or in the alternative, greatly increasing the hover ceiling that can be reached carrying a given payload.

In connection with the foregoing descrption, the operation has been explained in terms of torque. In helicoptor systems, engine speed is normally maintained constant so that torque is equivalent to horsepower.

In accordance with the present invention, a helicopter having means to drive a main rotor mast and a tail rotor through a transmission with engine output delivered to the transmission being indicated on an instrument panel is provided with means to sense the torque in the main mast with means connneced to the sensing means to indicate on a panel the torque on the main mast, thereby to permit the pilot maximum utilization of power available.

In accordance with a more specific aspect of the invention, a hollow main rotor mast is driven at the lower end thereof and has a main hub connection at the upper end thereof with a sensing tube secured to and extending from the upper end to a point adjacent the lower end thereof and wherein means are provided for sensing the relative positional relationship between the lower end of the main rotor mast as driven and the lower end of the sensing tube to evaluate the amount of torque applied to the main rotor mast with means for displaying to a pilot the magnitude of the torque.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
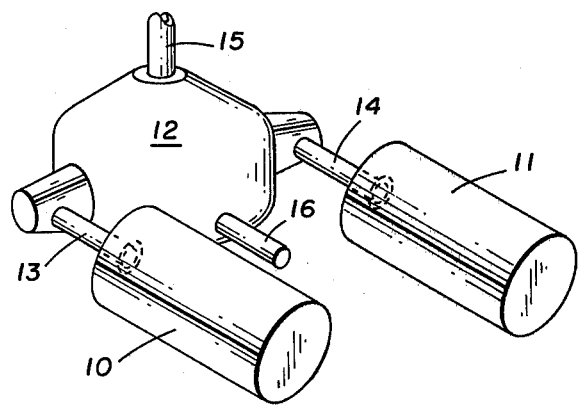
FIG. 1 is a diagrammatic representation of a helicopter system powered from two engines.

Referring now to FIG. 1, major elements of a power train for a helicopter have been illustrated. Engines 10 and 11 are coupled to a transmission 12 by way of shafts 13 and 14, respectively. The transmission is so mounted as to drive a main mast 15 and a shaft 16 leading to a tail rotor.

Engines 10 and 11 normally are operated at a constant speed with variations in power demand being commanded through changes in the controls on the helicopter main rotor and tail rotor. In order to provide guidance to a pilot, the torques on shafts 13 and 14 normally are indicated on a meter in the cockpit. As above described, the engines 10 and 11 normally are capable of output power substantially greater than the power transmission 12 is capable of delivering to mast 15 and shaft 16. However, because it is desirable to be able to utilize the maximum power the transmission 12 can deliver, it has been found that the torque on the main mast 15 provides a unique element of information for a pilot to aid in efficient operation.

In accordance with the present invention, such information is provided the pilot by sensing the torque on mast 15 and applying a representative function to a suitable display in the cockpit. One embodiment of the invention is shown in FIG. 2.

Figure 2:
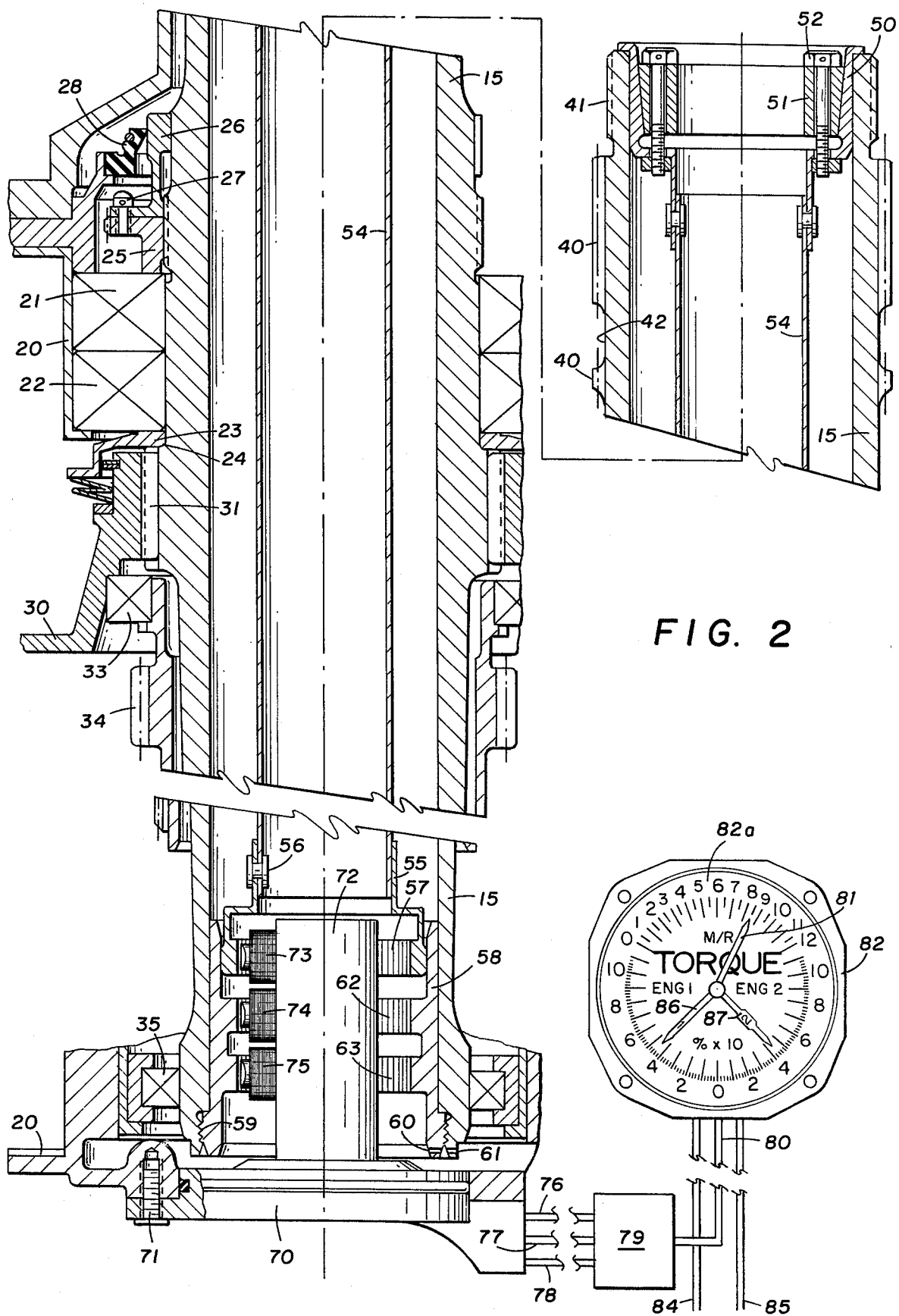
FIG. 2 is a sectional view taken through a mast in a system embodying the present invention.

Referring to FIG. 2, portions of the main rotor mast 15 have been shown in section with a main rotor mast torque sensor mounted therein. The main rotor mast 15 is supported relative to the airframe 20 by duplex bearings 21 and 22 which bear the thrust and side loads imposed on the main rotor mast 15. Bearings 21 and 22 are seated on a member 23 which is supported on a shoulder 24. The upper face of the bearing 21 is clamped by a nut 25 which engages a threaded portion on the surface of the main rotor mast 15. A locking member 26 engages splines associated with the threads securing nut 25. A pin 27 secures the nut 25 to the locking member 26. An oil seal 28 then is provided between the frame 20 and the locking member 26.

A planetary gear carrier 30 engages splines 31 on main rotor mast 15 immediately below bearing 22. A planetary support bearing 33 supports the planetary gear carrier 30. Planetary gears (not shown but housed in carrier 30) mesh with an external gear body 34 located immediately below bearing 33 and forming part of a sun gear system as is well known in the art.

Main rotor mast 15 extends downward through the sun gear body 34 and is supported at its lower end by a rotor bearing 35 which is mounted to the main frame 20.

External splines on a portion of the main mast (not shown) are provided for coupling to a conventional swashplate system (not shown). Above that, the main rotor mast 15 extends to its top where splines 40 are provided for coupling the rotary head assembly to the main rotor mast 15. The extreme upper end of rotor mast 15 is provided with threads 41 which receive a nut (not shown) which is provided to hold down the rotary head assembly. A groove 42 is provided for receiving a thrust ring which carries the principal thrust load.

A ring 50, having an inner wall which is tapered, is inserted into the upper end of the main rotor mast 15. A ring 51 having tapered outer surface is inserted into the ring 50. A bolt 52 is then provided for clamping rings 50 and 51 together and to expand ring 50 so that it is held in frictional engagement inside the upper end of the main rotor mast 15.

A reference tube 54 is then connected to the lower end of the ring 50 and extends coaxially downward the length of the main rotor mast. On the lower end of the main rotor mast, a ring gear carrier 55 is mounted as by a rivet 56. Carrier 55 supports a ring gear 57. An insert 58 is mounted in the lower end of the main rotor mast 15 and is secured therein by threads 59 and locked by a suitable keeper extending through the extremities 60 and 61. Insert 58 carries a pair of internal ring gears 62 and 63 which are identical to ring gear 57. However, gears 62 and 63 are fixed to and move with the main rotor mast 15 whereas gear 57 is fixed to and moves only with the lower end of the reference tube 54.

The lower end of the carrier 55 closely fits inside the upper end of the insert 58. Insert 58 is affixed to and rotates with the mast 15. With no torque on the mast 15, there is no twisting of the mast 15 and the span between the base and the tip so that the ring gear 57 rotates with ring gears 62 and 63 without change of relative position between the two. However, when torque is applied to the main mast 15, it causes slight twisting of the mast. The relative rotational positions between gear 57 on the one hand and gears 62 and 63 on the other hand is changed by the amount of the twist since the reference tube 54 is not subject to any torque. The contact between the carrier 55 an the insert 58 is a sliding contact which maintains gears 57, 62 and 63 coaxially aligned and at the same time permits rotational motion therebetween.

A torque sensor base 70 is secured to the frame 20 as by bolts 71 and has an upstanding support 72 extending up into the lower end of the main rotor mast 15. Support 72 carries three coils 73, 74 and 75 which have pole pieces which are in registration with the inner face of gears 57, 62 and 63, respectively.

Voltages are generated in coils 73, 74 and 75 which are dependent upon the rotation of gears 57, 62 and 63, respectively, past the pole faces upon which coils 73, 74 and 75 are mounted. Alternating current signals from coils 73, 74 and 75 are then applied by way of cables 76, 77 and 78 to a processing unit 79. The signal from coil 73 varies in phase relative to the signals from coils 74 and 75 depending upon torque. An output voltage from processing unit 79 is then applied by way of cable 80 to actuate a needle 81 on a meter 82. Needle 81 cooperates with an upper scale 82a to indicate the percentage of total available torque that is actually applied to the main rotor mast 15 at any time. Cables 84 and 85 are connected to actuate needles 86 and 87, respectively, to indicate the torque output of engines 10 and 11, respectively, as represented by the torque on shafts 13 and 14 of FIG. 1. Thus, the present invention provides a pilot with a new and significant element of information critical to operation of the aircraft. In those flight configurations where power is required on the tail rotor, the pilot is permitted to increase the payload for a given hover ceiling or to increase the hover ceiling limits for a given payload and thus provide significant information for the operation of the aircraft.

In general, the torque measuring system, such as represented by the processor 29, is well known and per se is not applicants' contribution to the art. Such systems generally are known, being manufactured and sold by Simmonds Precision Products, Inc., Vergennes, Vermont, and identified as Industrial Horsepower System, and are described as to structure and operation in the Simmonds Precision Products Manual PD-032. Thus, the details of the processor 79 will not be described in detail nor will the details of the gears 57, 62 and 63 and coils 73, 74 and 75. Applicants have provided a system for utilization of such torque measuring components in the environment illustrated in FIG. 2 to provide unique information for a pilot in the management and control of aircraft flight.

Figure 3:
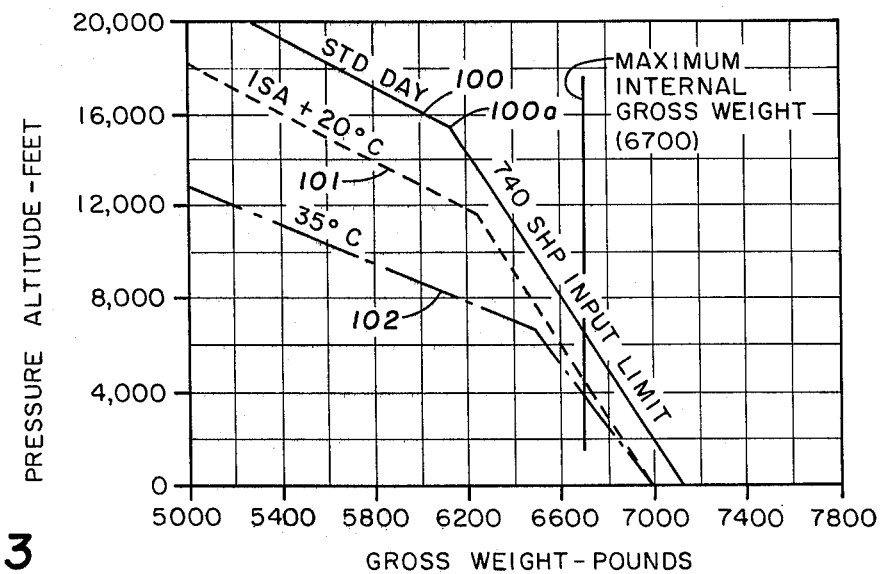
FIGS. 3 and 4 are graphs indicating increased capability by utilization of the present invention.

FIG. 3 illustrates "out of ground effect" hover performance of a particular aircraft which in a general sense is typical and many aircraft. In FIG. 3, the gross weight in pounds is plotted as abscissa and pressure altitude is plotted in feet as ordinants. For the given aircraft, the maximum internal gross weight is 6700 lbs. The aircraft has an applied or prescribed limit which is not to be exceeded, namely 740 shaft horsepower at the input to transmission 12.

Three curves 100, 101 and 102 are plotted for conditions of "standard day," "international standard atmosphere plus 20° C." and a "constant 35° C" condition. The curves break sharply as at point 100a where the load limit line of 740 shaft horsepower intersects the standard day power available curve 100. The break 100a occurs at about 15,000 ft. altitude. Above that altitude or below the rate represented thereby, the engine power available decreases linearly to the intersection of the limit of power to be delivered to the transmission 12 by engines 10 and 11 through shafts 13 and 14.

Figure 4:
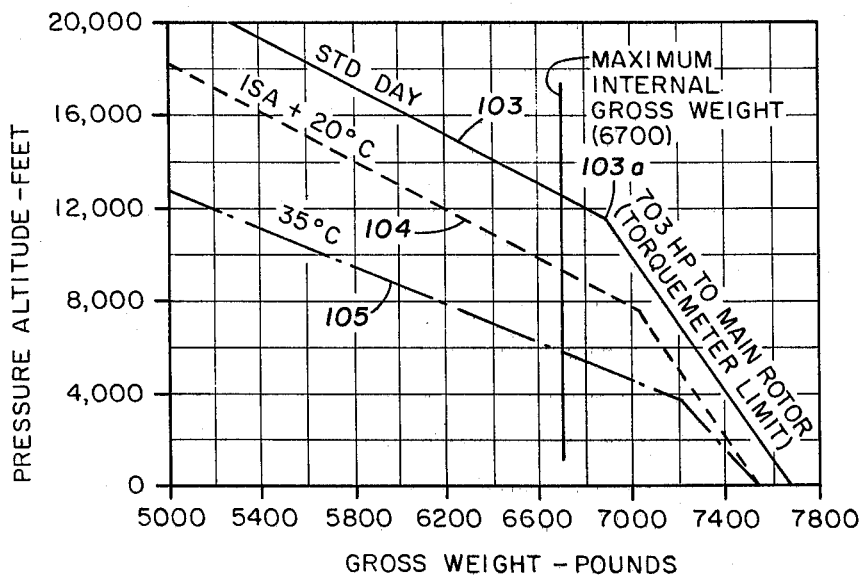

To illustrate the advantage of providing information as to the main rotor mast torque in accordance with the present invention, the same maximum internal gross weight of 6700 lbs. can be handled at elevations of almost 13,000 ft. whereas without the present information input, the pilot would not be permitted to exceed an altitude of 6500 ft. Similar differences are obtained under international standard atmosphere plus 20° C. conditions and at a constant 35° C condition. More particularly, curves 103, 104 and 105 of FIG. 4 are intersected by a 703 horsepower to main rotor torquemeter limit curve at the break pont 103*a*. Thus, the availability of the actual torque on the main rotor mast permits greater utilization of the available engine power and thus greatly increases the capacity or capability of the aircraft. Without the information available as to the actual torque on the main rotor mast, a pilot would not be permitted to operate the engines as to apply input power adequate to tax the capability of the main rotor mast. With main rotor mast torque information available, as by the present invention, then the aircraft is permitted to operate at greater loading than would otherwise be possible.

The display on a meter 82 permits the pilot to ascertain the percentage of actual engine torque being used at any one time and the percentage of torque actually present on the main rotor (M/R). For the particular condition indicated on meter 82, engines 1 and 2 would be operating at output shaft torque of slightly more than 40% of rating whereas the main rotor (M/R) torque would be between 80% and 90%. This means that little if any torque is being used in the tail rotor. However, in flight conditions where substantial power is being utilized in the tail rotor, the sum of the percentages of engine 1 and engine 2 torque outputs would substantially exceed the torque applied to the main rotor shaft, thus providing the pilot with a significant new element of information. The problem of generating the main rotor torque signal will be recognized as involving the unusual problem of providing a reference. The mechanisms required to power the main rotor mast and to provide controls of the main rotor make difficult providing a reference on the outside of the main rotor mast. Thus, the reference tube 54 extends inside the mast with the lower end thereof stabilized by the contact between the gear structure 57 and the insert 58. Sensor coils 73–75 are mounted on support 72 permit the generation of the torque signals in the demanding helicopter environment.

Insert 58 is integrated and secured in the lower end of the main mast 15. It has at least one internally facing ring gear 62, 63 coaxially oriented within the mast. The structure on the lower end of the reference tube 54 also has at least one internally facing ring gear coaxially mounted within the lower end of the main mast. The support 72 is coupled to the fuselage as by the mounting bolts 71 and has the coil elements 73–75 whose cores having wedge-shaped ends confront the ring gears to produce in the coils 73–75 alternating current voltages upon rotation of the mast in the reference tube relative to the fuselage. The processing unit 79 utilizes the voltages on coils 73–75 to produce a phase difference signal which is representative of the relative rotation between the ring gears produced by application of torque to the main mast 15 which twists the main mast to cause information for display on the meter 82.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a helicopter having a main mast driving a main rotor mounted at the upper end thereof to support a fuselage secured to the lower end thereof, the combination which comprises:
   (a) a reference structure connected to said main mast at said upper end and extending to the lower end thereof;
   (b) first ring gear means integrally secured in the lower end of said main mast and having at least one internally facing ring gear coaxial with said main mast;
   (c) second ring gear means mounted at the lower end of said reference structure within said main mast, and having at least one internally facing ring gear coaxial with said main mast;
   (d) base means coupled to said fuselage and extending upwardly into the lower end of said main mast;
   (e) voltage generation means mounted on said base means and confronting said first and said second ring gear means for production of alternating current voltages dependent upon the rotation of said main mast and said reference structure relative to said fuselage;
   (f) means to convert said voltages into a phase difference signal representative of relative rotation between said first and said second ring gear means produced by the application of torque which twists said main mast; and
   (g) means for displaying said phase difference signal to a pilot.

2. A method of providing a visual display of both available torque and applied torque for a main rotor mast of a helicopter system to indicate the reserve capacity of the main rotor mast, said helicopter system having at least one engine system coupled through a transmission to both said main mast and a tail rotor shaft, which comprises:
   (a) sensing the output of said engine system to detect said available torque;
   (b) monitoring the amount of twist in said main mast produced through driving said main rotor by securing a reference structure to the upper end of said main mast, said reference structure depending coaxially from the upper end and extending the length of said main mast, and detecting the relative rotation between the base of said main mast and said reference structure as a measure of said applied torque;
   (c) generating electrical signals representative of said available torque and said applied torque; and
   (d) applying said signals to a display.

* * * * *